J. A. Safford,
Splitting Leather,
No. 1,956. Reissued May 9 1865.
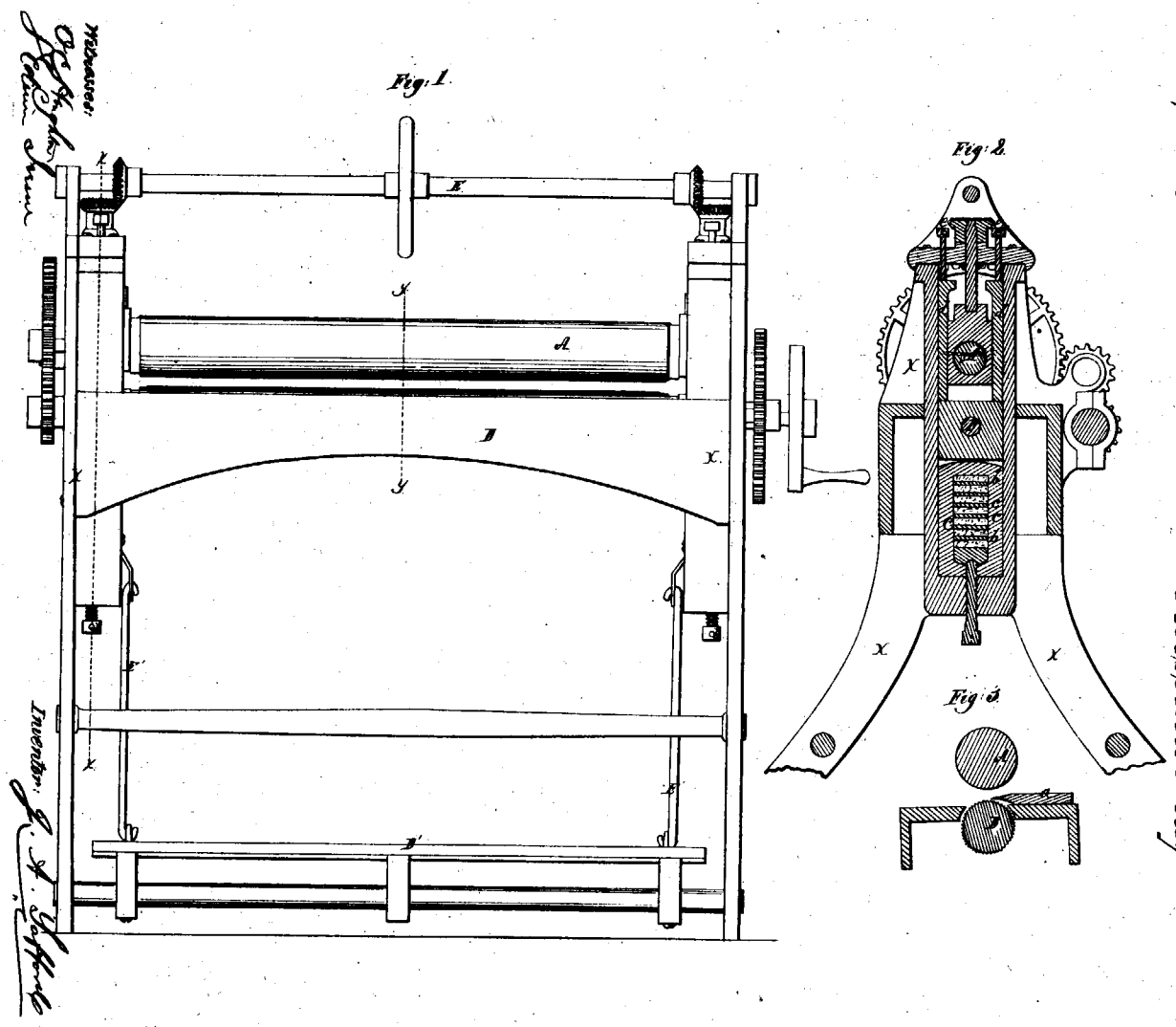
N. PETERS, PHOTO-LITHOGRAPHER, WASHINGTON, D. C.

UNITED STATES PATENT OFFICE.

J. A. SAFFORD, OF BOSTON, MASSACHUSETTS.

IMPROVED LEATHER-SPLITTING MACHINE.

Specification forming part of Letters Patent No. 41,448, dated February 2, 1864; Reissue No. 1,956, dated May 9, 1865.

*To all whom it may concern:*

Be it known that I, J. A. SAFFORD, of Boston, in the county of Suffolk and Commonwealth of Massachusetts, have invented certain new and useful Improvements in Machines for Splitting Leather, of which the following is a clear and exact description, reference being had to the accompanying drawings and letters of reference, in which—

Figure 1 represents a front elevation of a machine with my improvements; Fig. 2, a vertical transverse section of the same, taken through the line *x x* of Fig. 1; Fig. 3, a vertical transverse section of the upper and lower rolls, the knife, and the table, taken through the line *y y* of Fig. 1.

Letters Patent of the United States, dated March 19, 1861, and numbered 742, were duly issued to me for an improved machine for splitting leather, and in the specification thereto annexed the construction and operation of said machine are described in detail.

The nature of my present invention consists in certain improvements upon some portions of the mechanism employed in my former invention—viz., in a new and improved spring to be used in connection with the lower or feed roll, in place of the spiral spring in my former specification described, of more equal tensity and positive action, and also in a modification of the form of the knife, by which modification the choking of the machine below the knife and after the leather is cut is rendered much less probable.

The spiral spring described in my former specification, which is common to many machines constructed for similar purposes, I have found by use and experiment is not positive or reliable in its operation, as the two springs used at either end of the roller are liable to be of unequal tensity, so that the two ends may not be depressed alike, and, furthermore, the tensity of such springs is more or less affected by use, and that, too, in an unequal degree. The use of springs composed in whole or in part of rubber or gutta-percha has hitherto been liable to this objection—that the dropping of the oil necessary to the lubricating of such machines upon the rubber destroys or seriously affects its elasticity so that it soon becomes useless. To obviate these objections I construct my new and improved springs as follows: I bore a chamber into a solid block of iron of the proper size and shape, (or the same may be cast in proper form with the chamber,) which chamber I fill with alternate layers of rubber or similar material, and then iron or metal plates, until the same is filled, when the open end of the chamber is closed by a cap secured by a set-screw, the solid end of the chamber being placed uppermost so that the elasticity of the material cannot in any way be affected by outside influences, such layers being cut of such form and size with reference to the chamber that they may have room for expansion to give the required elasticity.

My present invention comprises also a knife of improved form. The knife described in the specification above alluded to and common to most splitting-machines was one the cutting-edge of which was at the center of it and formed by a straight bevel alike on both sides. This construction of the knife, however, left too little space between it and the surface of the feed-roll B, in consequence of which the machine was easily clogged or choked.

My present invention therefore consists, first, in constructing a double-beveled knife with its cutting-edge beyond the center of the thickness of the blade or nearest to the outer surface of the same; and, second, in making the bevel on the under side of the knife concave to conform generally with the convex surface of the lower or feed roller, whereby I obtain the widest possible space or throat between the lower surface of the knife and the feed or lower roll, and thus greatly decrease the liability of said throat becoming clogged or choked.

Having now described the nature of my invention, I will proceed to describe its construction and operation, to enable others skilled in such matters to make and construct the same, describing particularly only such parts as are embraced in my present invention, other parts of such machine being common to many leather splitting machines, and the whole being described in the Letters Patent above referred to, No. 742.

In the accompanying drawings, X represents the frame of the machine, consisting of two standards connected together by cross-bars and by the table D. In these standards are slots or guideways, in which move the bearings of the upper and lower rollers, A and B. A is the upper or gage roll, suitably mounted in bearings, and moved up and down as required by means of the cross-shaft E and the double-beveled gear connected with it, in the same manner as described in the aforesaid Letters Patent No. 742. B is the lower or feed roll which is fluted to prevent the leather slipping, and by means of which the leather is fed up against the knife *a* to be split. This roller is suitably mounted in bearings moving in the slots above described, which bearings rest upon the springs *c c*, said springs being constructed as above described, which springs are connected with the treadle D by the connecting-rods E E. This lower roll, B, is kept in position from above by the gibs *d d*, regulated by the screws *e e*, as seen in Fig. 2. Through the bottom of each slot or guideway passes a screw-bolt, *e e*, which takes into the lower layer or cap of the spring C, as seen in Fig. 2. By means of this screw-bolt the relative position of the lower or feed roll with the knife is regulated, and also the tensity of the spring. The spring C is seen in section in Fig. 2. It consists of alternate layers of rubber and metal, *b* representing the rubber, and *c* the metal plates included in a close box or chamber, as above described.

*a* is the knife properly secured to the rear side of the table in a manner common to many leather-splitting machines, my present invention, so far as the knife is concerned, relating only to the position of the cutting-edge in relation to the top and bottom surfaces of the blade and to the concave shape of the under bevel of the same. It is not, however, essential that the under bevel should be concave, provided the cutting-edge of the knife be made beyond the center, as described above, as it would operate even if straight or slightly convex. I prefer, however, in all cases to make the under bevel slightly concave, for the purpose of enlarging the throat or space between the knife and lower or feed roll.

The operation of the machine is as follows: The gage-roll is adjusted to the required distance by turning the shaft E. The leather is then inserted between the gage and feed rollers and so fed up against the knife. The feed-roll, thus resting upon springs of equal and certain tensity, presses firmly against the under surface of the leather, and at the same time yields to the inequalities of the leather, and so prevents the breaking or the choking of the machine. Whenever it is desirable, the feed-roll can be still further depressed, at the will of the operator, by the use of the treadle.

Having now described my invention, what I claim, and desire to secure by Letters Patent, is—

1. The spring C, constructed and operating substantially as set forth.

2. The spring C, in combination with the feed-roll B, the whole being constructed and operating substantially as and for the purpose described.

3. The knife *a*, constructed with two bevels and having the cutting-edge beyond the center of the thickness of the knife, as set forth, when combined with the feed-roll B, substantially as described.

4. Making the under bevel of the knife *a* concave to conform generally with the convex surface of the feed-roll B, substantially as and for the purpose described.

J. A. SAFFORD.

Witnesses:
N. AMES,
E. C. HARRINGTON.